United States Patent
Sander

(10) Patent No.: US 6,551,535 B2
(45) Date of Patent: Apr. 22, 2003

(54) EXTRUSION COATING PROCESS FOR CATALYTIC MONOLITHS

(75) Inventor: Karel Sander, Woonsocket, RI (US)

(73) Assignee: ACS Industries, Inc., Woonsocket, RI (US)

( * ) Notice: Subject to any disclaimer, the term of this patent is extended or adjusted under 35 U.S.C. 154(b) by 121 days.

(21) Appl. No.: 09/772,701

(22) Filed: Jan. 30, 2001

(65) Prior Publication Data

US 2002/0100994 A1 Aug. 1, 2002

(51) Int. Cl.[7] ............... B32B 31/30; B29C 47/02; F01N 3/20; F01N 3/28
(52) U.S. Cl. ............... 264/39; 264/37.1; 264/102; 264/149; 264/171.11; 264/171.12; 264/279; 264/643; 264/911; 29/458; 422/180; 425/97
(58) Field of Search ............... 264/39, 279, 630, 264/643, 631, 171.11, 171.12, 102, 149, 37.1, 911; 29/458; 422/180; 425/97

(56) References Cited

U.S. PATENT DOCUMENTS

| | | | | |
|---|---|---|---|---|
| 1,845,685 A | * | 2/1932 | Young | 181/199 |
| 3,424,836 A | * | 1/1969 | McKelvey et al. | 118/316 |
| 4,115,071 A | * | 9/1978 | Masuda et al. | 165/81 |
| 4,269,807 A | * | 5/1981 | Bailey et al. | 264/262 |
| 4,343,074 A | * | 8/1982 | Bailey et al. | 29/455.1 |
| 5,188,779 A | * | 2/1993 | Horikawa et al. | 264/630 |
| 5,207,989 A | * | 5/1993 | MacNeil | 106/626 |
| 5,273,724 A | * | 12/1993 | Bos | 422/177 |
| 5,385,873 A | * | 1/1995 | MacNeill | 106/626 |
| 5,433,904 A | * | 7/1995 | Noky | 264/40.1 |
| 5,629,067 A | * | 5/1997 | Kotani et al. | 422/177 |
| 5,736,109 A | * | 4/1998 | Howorth et al. | 264/279 |
| 5,862,590 A | * | 1/1999 | Sakashita et al. | 29/446 |
| 6,031,040 A | * | 2/2000 | Horacek | 428/323 |
| 6,336,265 B1 | * | 1/2002 | Niedermair | 19/157 |

\* cited by examiner

Primary Examiner—Jan H. Silbaugh
Assistant Examiner—Michael I. Poe
(74) Attorney, Agent, or Firm—Bradley N. Ruben PC

(57) ABSTRACT

A high throughput, automated process for coating ceramic monoliths used as catalytic converters that overcomes problems with coating monoliths individually in a mold. The monoliths are provided with end caps to cover the open functional ends, then loaded serially into an inlet channel leading to an extrusion chamber. As each monolith is pushed into the channel, one monolith enters the extrusion chamber, and the monolith just coated in the extrusion chamber is made to exit onto a finished part conveyor. Thereafter, the end caps are removed and cleaned for reuse on new monoliths yet to be coated.

7 Claims, 1 Drawing Sheet

EXTRUSION COATING PROCESS FOR CATALYTIC MONOLITHS

BACKGROUND AND SUMMARY OF THE INVENTION

This invention relates to a method of applying a seal to catalyst monolith structures used in catalytic converters. More particularly it relates to an apparatus and a method for the extrusion of a seal coating onto the outer surface of such structures.

Catalytic converters are used for catalytically treating the exhaust gas of internal combustion engines. A conventional catalytic converter includes a relatively fragile ceramic monolithic catalyst structure which has a catalyst such as platinum deposited thereon. The catalyst structure typically has a cylindrical side surface and open functional end surfaces. Exhaust gases are treated by passing them through the catalyst structure from the input end to the output end. In a catalytic converter the catalyst structure is mounted within a metal housing.

A seal is disposed between the metal housing and the catalyst structure to support the monolithic catalyst structure within the housing. The seal fills the space between the housing and the catalyst structure so that gases can not leak through this space and so that substantially all of the exhaust gases entering the inlet end of the catalytic converter will pass through the catalyst structure. In addition to preventing gases from bypassing the catalyst structure, the seal holds the catalyst structure in place within the housing, thereby cushioning this relatively fragile ceramic structure to prevent breakage resulting from physical shocks due to mechanical vibration typical of automotive vehicles.

The seals used in catalytic converters are often made of a paste is coated onto the exterior lateral surface of the catalyst structure. This seal material must be able to withstand temperatures in excess of 2000° F. since the catalytic converter will be exposed to such temperatures during operation. It must also be capable of holding the catalyst structure in place within the housing while dampening mechanical vibration between the housing and the catalyst structure.

Such a temperature resistant seal may, for instance, be made from a mixture in which an aqueous dispersion of high aspect ratio vermiculite is blended with ceramic fibers to produce a relatively smooth formable blend of vermiculite and fibers. A paste formed of this mixture is applied to the exterior lateral surface of the monolithic catalyst structure so that it encircles the structure while leaving the functional end surfaces uncovered so that exhaust gas can pass through.

Examples of mixtures suitable for such seals are disclosed in U.S. Pat. Nos. 5,207,989 and 5,385,873 and in British Patent No. 1,522,646, the disclosures of which are incorporated herein by reference. One example of such a material is a mixture comprising between approximately 28 and 80 dry weight percent of ceramic fibers capable of withstanding continuous exposure to temperatures in excess of 2,000° F., between approximately 20 and 50 dry weight percent of an aqueous dispersion of high aspect ratio vermiculite and preferably also between approximately 5 and 60 percent dry weight percent of low temperature expanded vermiculite.

In the prior art, the seal material is applied to the catalyst structures by placing the catalyst structure in a mold and injecting the seal material between the mold and the catalyst structure to coat the structure. The coated catalyst structure is then heated to remove liquids from the seal material, effectively curing it in place around the monolithic catalyst structure. This process is time consuming since each catalyst structure must be separately coated with the seal material. In addition, there is a danger of inadvertently applying the seal material to the functional end surfaces of the catalyst structure. Alternatively, the catalyst structure could be mounted within the housing of the catalytic converter and the seal material could be injected into the space between the catalytic structure and the surrounding housing. Injecting the material directly into the space between the housing and the catalyst structure can result in damage to the relatively fragile ceramic structure and/or can fail to provide a uniform seal between the structure and the housing, since the seal cannot be inspected as it may be in the molding operation.

It is an object of the present invention to coat monolithic catalyst structures with seal material by a high speed extrusion coating operation in which a number of monoliths are passed through an extrusion chamber in which they are coated with the seal mixture in a continuous operation. This continuous process methodology shortens the time needed to apply the seal coating to each of the monoliths, thereby resulting in faster production and a cost savings.

It is a further object of this invention to apply a uniform and smooth seal coating to the lateral sides of monolithic catalyst structures, especially without having to coat each monolith separately in a mold.

Another object of this invention is to apply a seal coating to the lateral sides of the monolithic catalyst structures in a manner that will protect the functional end faces of the catalyst structures from being contaminated by the seal material.

Other objects, features and advantages of the invention will become apparent from the following description, when considered in connection with the accompanying drawing.

BRIEF DESCRIPTION OF THE DRAWINGS

In the drawing which illustrates the best mode presently contemplated for carrying out the present invention.

DESCRIPTION OF THE INVENTION

Figure 1:
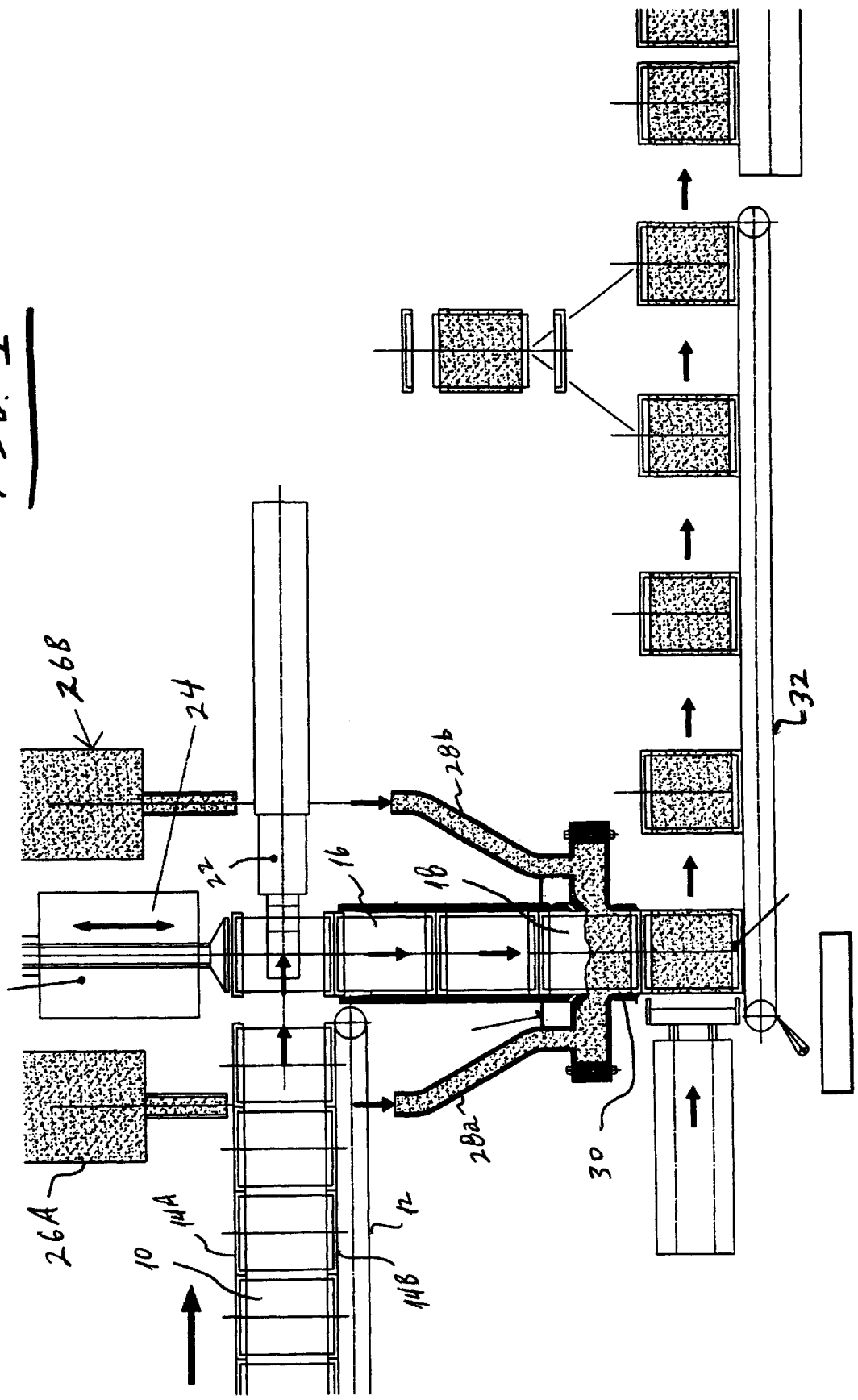
FIG. 1 is a schematic illustration of the apparatus used in the invention to continuously coat monolithic catalyst structures.

Referring to FIG. 1, a number of monolithic catalyst structures 10 are shown on a loading conveyor 12. End caps 14a, 14b, which may be made of rubber or other suitable material, are placed over each functional end of the catalyst structures. The catalyst structures with their end caps are transported by the loading conveyor 12 to the entry 16 of an extrusion chamber 18.

A conventional and commercially available pick and place apparatus 22, which may be a robot arm, positions each catalyst structure so that it is aligned end to end with other such catalyst structures to form a column of such structures at the entry to the extrusion chamber 18. A linear pushing device 24 then engages the end cap of the last catalyst structure in the column and pushes on the column to move one of the catalyst structures into the extrusion chamber 18.

The end caps 14a, 14b separate the individual catalyst structures in the column from each other and space the structures so that the structures will be properly positioned in the extrusion chamber. The end caps 14a, 14b also cover the functional end faces of each catalyst structure to prevent the application of seal material to these surfaces as the structures pass through the extrusion chamber. Still further, the end caps form seals above and below the monolith to maintain the seal material within the extrusion chamber.

The pusher mechanism 24 is synchronized with extruder pumps 26a, 26b. As the pusher mechanism 24 moves the column of catalytic structures so that one of the structures enters the extrusion chamber 18, the extruder pumps supply the seal material to the extrusion chamber though feed lines 28a, 28b. Vacuum vents 30a, 30b remove air from (de-air) the extrusion chamber 20 to ensure that entrapped air does not prevent the available space around the catalyst structure from being completely filled with the sealing material, and allowing the seal material to be applied over the entire lateral surface of each of the catalyst structures. De-airing is continued for a time effective to remove air bubbles entrapped in the seal material. The extruder pumps are preferably reciprocating piston pumps, driven by servo motors, and the amount of seal material pumped is controlled as a function of the monolith speed through the extrusion chamber.

When the pusher mechanism moves the next catalyst structure into the extrusion chamber to be coated, it forces the preceding coated catalyst structure in the column out of the chamber. The cycle time of the pusher mechanism is chosen so that each of the catalyst structures will be in the extrusion chamber for a sufficient period to ensure that its lateral surface is completely coated with the seal material. The cycle time can be as short as two seconds, or even shorter, depending on the size of the monolith, the dimensions of the chamber, the vacuum vents, and the size of the manifolds or feed lines with respect to the head developed by the extruder pumps.

As it passes out of the extrusion chamber 18, the catalyst structure passes through a calibrating ring 30 which strips away excess seal material from the structure's lateral surface and provides a smooth seal surface coating of the desired thickness. The coated monolith exits the extrusion chamber onto a finished parts conveyor 32. The rubber end caps 14a, 14b are then removed from each of the catalyst structures either manually or, more prefera bly, by suitable robotic equipment. These end caps can then be cleaned and recycled for use on other monoliths yet to be coated. The excess material, while preferably removed by a calibrating ring at the outlet of the extrusion chamber, can be removed in a separate step after the coated structure has been removed to the finished parts conveyor. For example, a ring-like cutter can be made to come down over the coated structure when it resides at a specific location, similarly stripping away excess seal material; or a rotating table may be interposed in the coveyor, and the coated part rotated adjacent to a stripping or doctor blade.

The pusher mechanism, extruder pumps, and the final part conveyor are all synchronized by a programmable logic controller.

After they are coated with the seal material, the catalyst structures are then placed in a drying oven. The drying oven heats the monolith and its seal coating so that substantially all of the water evaporates from the seal material. After drying, the finished coated catalyst structure is either stored for future use or is mounted in a housing to complete the assembly of a catalytic converter.

The apparatus described above can be used to coat catalytic monoliths having different diameters and shapes by utilizing an extrusion chamber of an appropriate size and shape. The shape of the extrusion chamber can be changed by removing and replacing the chamber with a more appropriate device, or the extrusion chamber can be made to have variable walls, either solid that are fixed by pneumatics, hydraulics, or mechanics, or may have pliable walls that are backed by a pneumatic, hydraulic, or mechanical device to change their shape. This molding apparatus provides a continuous, high volume production flow of coated monoliths with minimum maintenance. The use of an extrusion chamber to coat the monoliths results in close tolerances on the diameter of the seal coating and a smooth seal surface.

While specific apparatus has been shown and described which embodies the invention, it will be apparent to those skilled in the art that various modifications and rearrangements of the parts may be made without departing from the spirit and scope of the inventive concept. Therefore the invention is not meant to be limited to the specific embodiments described and shown herein except as indicated by the scope of the appended claims.

What is claimed is:

1. A method for continuously applying seal material to monolithic catalyst structures, each structure having a lateral surface and two end surfaces, comprising:

applying temporary sealing to the end surfaces of each of the catalytic structures;

aligning the catalyst structures end to end to form a column;

moving the column of catalyst structures a discrete distance so that one of the catalyst structures moves into an extrusion chamber;

removing enough air from the extrusion chamber to ensure that the available space within the chamber will be filled with seal material;

supplying seal material to the extrusion chamber effective to coat the structure;

moving the column of catalyst structures a discrete distance effective to push another structure into the chamber and to remove the structure just coated from the chamber; and removing the temporary sealing from the end surfaces of the coated structure.

2. A method as claimed in claim 1, further comprising removing excess seal material from the coated structure.

3. A method as claimed in claim 1, wherein the steps of moving the column, removing air, and supplying seal material are synchronized using a control system.

4. A method as claimed in claim 1, whererin the temporary sealing comprises end caps.

5. A method as claimed in claim 4, including the additional steps of cleaning and recycling the end caps for use on other structures to be coated.

6. A method as claimed in claim 1, including the additional step of removing water from of the seal material coated onto the structure.

7. A method as claimed in claim 6, wherein the water is removed by heating in a dryer.

* * * * *